United States Patent [19]

Jin et al.

[11] 4,340,435

[45] Jul. 20, 1982

[54] ISOTROPIC AND NEARLY ISOTROPIC PERMANENT MAGNET ALLOYS

[75] Inventors: Sungho Jin, Gillette; Thomas H. Tiefel, Rockaway, both of N.J.

[73] Assignee: Bell Telephone Laboratories, Incorporated, Murray Hill, N.J.

[21] Appl. No.: 197,970

[22] Filed: Oct. 17, 1980

[51] Int. Cl.[3] .............................................. C04B 35/00

[52] U.S. Cl. ................................ 148/31.57; 148/101; 148/120

[58] Field of Search .................. 148/31.55, 31.57, 101, 148/102, 121, 120; 75/123 N, 123 K, 123 J

[56] References Cited

U.S. PATENT DOCUMENTS

| | | | |
|---|---|---|---|
| 2,707,680 | 5/1955 | Succop | 75/123 K |
| 3,971,676 | 7/1976 | Detert et al. | 75/123 K |
| 4,128,420 | 12/1978 | Esper et al. | 75/123 K |
| 4,162,157 | 7/1979 | Parker et al. | 75/123 J |

OTHER PUBLICATIONS

R. M. Bozorth, *Ferromagnetism*, Van Nostrand, 1959, pp. 34-37; 236-238 and 382-385; 417.

W. S. Messkin et al., "Experimentelle Nachprufung der Akulovschen Theorie der Koerzitivkraft", *Zeitschrift fur Physik*, vol. 98, (1936), pp. 610-623.

H. Matsumoto et al., "Characteristics of Fe-Mo and Fe-W Semihard Magnet Alloys", *Journal of the Japanese Institute of Metals*, vol. 43, (1979), pp. 506-512.

K. S. Seljesater et al., "Magnetic and Mechanical Hardness of Dispersion Hardened Iron Alloys", *Transactions of the Am. Soc. for Treating Steel*, vol. 19, pp. 553-576.

W. Koster, "Das System Eisen-Nickel-Molybdan", *Archiv fur das Eisenhuttenwesen*, vol. 8, No. 4, (Oct. 1934), pp. 169-171.

*Metals Handbook*, American Society for Metals, vol. 8, p. 431.

*Primary Examiner*—John P. Sheehan

*Attorney, Agent, or Firm*—Peter A. Businger

[57] ABSTRACT

To provide for an inexpensive magnet alloy, isotropic and nearly isotropic permanent magnet properties are developed in Fe-Mo-Ni alloys. Manufacture may be by a method which comprises steps of annealing, optional deforming by a limited amount, and aging.

Typical magnetic properties of alloys of the invention are a coercive force in the range of 50-500 oersted, a magnetic remanence in the range of 7000-14,000 gauss, and a magnetic squareness ratio of less than 0.9. Alloys of the invention are highly ductile even after plastic deformation, they are readily bonded to aluminum supports (as used, e.g., in the manufacture of twistor memories), and they are readily etched by etchants which leave aluminum unaffected.

4 Claims, 4 Drawing Figures

ISOTROPIC AND NEARLY ISOTROPIC PERMANENT MAGNET ALLOYS

TECHNICAL FIELD

The invention is concerned with magnetic materials and devices.

BACKGROUND OF THE INVENTION

Among established alloys having permanent magnet properties are Fe-Al-Ni-Co alloys known as Alnico, Co-Fe-V alloys known as Vicalloy, and Fe-Mo-Co alloys known as Remalloy. These alloys possess desirable magnetic properties; however, they contain substantial amounts of cobalt whose rising cost in world markets causes concern. Moreover, high cobalt alloys tend to be brittle, i.e., to lack sufficient cold formability for shaping, e.g., by cold drawing, rolling, bending, or flattening.

Relevant with respect to the invention are the book by R. M. Bozorth, *Ferromagnetism*, Van Nostrand, 1959, pp. 34–37, pp. 236–238, pp. 382–385, and p. 417; the paper by W. S. Messkin et al., "Experimentelle Nachprufung der Akulovschen Theorie der Koerzitivkraft", *Zeitschrift fur Physik*, Vol. 98 (1936), pp. 610–623; the paper by H. Masumoto et al., "Characteristics of Fe-Mo and Fe-W Semihard Magnet Alloys", *Journal of the Japanese Institute of Metals*, Vol. 43 (1979), pp. 506–512; and the paper by K. S. Seljesater et al., "Magnetic and Mechanical Hardness of Dispersion Hardened Iron Alloys", *Transactions of the American Society for Steel Treating*, Vol. 19, pp. 553–576. These references are concerned with Fe-Mo binary and Fe-Mo-Co ternary alloys, their preparation, and their mechanical and magnetic properties. Phase diagrams of Fe-Mo-Ni alloys appear in W. Koster, "Das System EisenNickel-Molybdan", *Archiv für das Eisenhüttenwesen*, Vol. 8, No. 4 (October 1934), pp. 169–171, and in *Metals Handbook*, American Society for Metals, Vol. 8, p. 431.

SUMMARY OF THE INVENTION

According to the invention, isotropic and nearly isotropic permanent magnet properties are realized in Fe-Mo-Ni alloys which preferably comprise Fe, Mo, and Ni in a combined amount of at least 95 weight percent, Mo in an amount in the range of 10–40 weight percent of such combined amount, and Ni in an amount in the range of 0.5–15 weight percent of such combined amount. Alloys of the invention are ductile and cold formable before aging; they are magnetically isotropic or nearly isotropic after aging and typically exhibit multiphase microstructure.

Magnets made of such alloys may be shaped, e.g., by cold rolling, drawing, bending, or flattening and may be used in devices such as, e.g., permanent magnet twistor memories, hysteresis motors, and other devices.

Preparation of alloys of the invention may comprise annealing and aging, or plastic deformation and aging. Aging is preferably carried out at a temperature at which an alloy is in a two-phase or multiphase state.

DETAILED DESCRIPTION

Permanent magnet properties may be conveniently defined as remanent magnetic induction, $B_r$, greater than or equal to approximately 7000 gauss, coercive force, $H_c$, greater than or equal to approximately 50 oersted, and squareness ratio, $B_r/B_s$, greater than or equal to approximately 0.7. Isotropic magnets are characterized by magnetic properties which are essentially independent of the direction of measurement. Nearly isotropic magnets may be conveniently defined by a value of $B_r/B_s$ which in all directions is less than 0.9.

Figure 1:
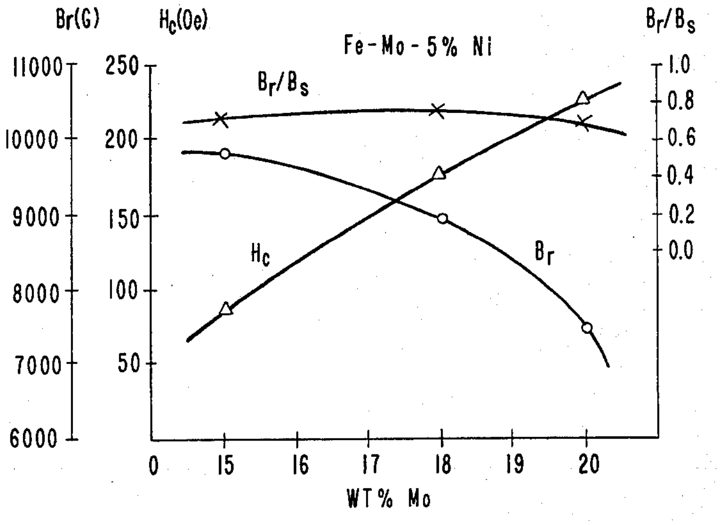
FIG. 1 shows isotropic magnetic properties of Fe-Mo-5Ni alloys according to the invention as a function of Mo content.
Figure 2:
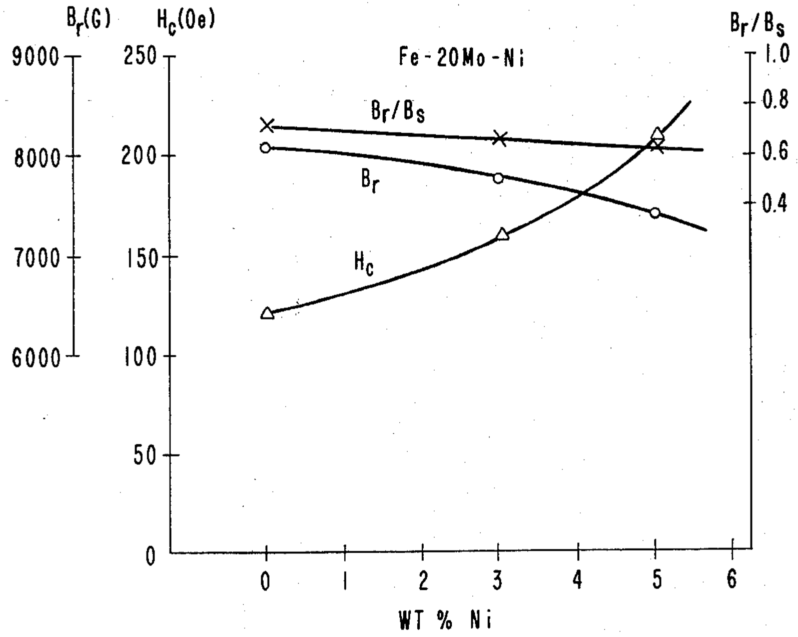
FIG. 2 shows isotropic magnetic properties of Fe-20Mo-Ni alloys according to the invention as a function of Ni content.

In accordance with the invention, it has been realized that Fe-Mo-Ni alloys which comprise Fe, Mo, and Ni in a preferred combined amount of at least 95 weight percent and preferably at least 99.5 weight percent, Mo in an amount in the range of 10–40 weight percent of such combined amount, and Ni in an amount in the range of 0.5–15 weight percent of such combined amount, can be produced to have desirable isotropic or nearly isotropic permanent magnet properties. More narrow preferred ranges are 12–30 weight percent Mo and 1–10 weight percent Ni. The coercive force, $H_c$, of Fe-Mo-Ni alloys of the invention increases at the expense of remanent induction, $B_r$, as the amount of Mo is increased (see FIG. 1). The presence of Ni in alloys of the invention has been found to significantly contribute to the ductility of such alloys, thus allowing easy cold rolling or cold forming; in this respect, alloys of the invention are superior to Fe-Mo binary alloys especially for higher Mo contents. It has also been found that the addition of nickel significantly improves the magnetic properties, especially coercivity and maximum magnetic energy product, $(BH)_{max}$. Magnetic properties (coercive force, $H_c$, in particular) increase as the amount of nickel increases (see FIG. 2). Excessive amounts of nickel, however, are not desirable because magnetic properties such as, e.g., saturation induction, $B_s$, as well as remanent induction, $B_r$, decrease at higher levels of nickel.

Alloys of the invention may comprise small amounts of additives such as e.g., Cr for the sake of enhanced corrosion resistance, or Co for the sake of enhanced magnetic properties. Other elements such as, e.g., Si, Al, Cu, V, Ti, Nb, Zr, Ta, Hf, and W may be present as impurities in individual amounts preferably less than 0.2 weight percent and in a combined amount preferably less than 0.5 weight percent. Similarly, elements C, N, S, P, B, H, and O are preferably kept below 0.1 weight percent individually and below 0.5 weight percent in combination. Minimization of impurities is in the interest of maintaining alloy ductility and formability. Excessive amounts of elements mentioned may be detrimental to magnetic properties, e.g., by lowering of saturation induction.

Magnetic alloys of the invention may possess isotropic or nearly isotropic multiphase grain and microstructure. Squareness ratio, $B_r/B_s$, of alloys of the invention is typically less than 0.9 and preferably less than or equal to 0.85, magnetic coercivity is in the approximate range of 50–500 oersted, and magnetic remanence is in the approximate range of 7000–14,000 gauss.

Alloys of the invention may be prepared, e.g., by casing from a melt of constituent elements Fe, Mo, and Ni in a crucible or furnace such as, e.g., an induction furnace; alternatively, a metallic body having a composition within the specified range may be prepared by powder metallurgy. Preparation of an alloy and, in particular, preparation by casting from a melt calls for care to guard against inclusion of excessive amounts of impurities as may originate from raw materials, from the furnace, or from the atmosphere above the melt. To minimize oxidation or excessive inclusion of nitrogen, it is desirable to prepare a melt with slag protection, in a vacuum, or in an inert atmosphere.

Cast ingots of an alloy of the invention may typically be processed by hot working, cold working, and solution annealing for purposes such as, e.g., homogenization, grain refining, shaping, or the development of desirable mechanical properties.

According to the invention, alloy structure may be magnetically isotropic or nearly isotropic. Isotropic structure may result, e.g., upon processing comprising annealing at a temperature in a preferred range of 800–1250 degrees C., rapid cooling, and aging. Preferred aging temperatures are in the range of 500–800 degrees C., and aging times are typically in a range of 5 minutes to 10 hours. If cold forming after aging is desired, cooling from aging temperature should preferably be rapid as, e.g., by quenching at a rate sufficient to minimize uncontrolled precipitation. Among benefits of such aging treatment is enhancement of coercive force and squareness of the magnetic B-H loop as may be due to one or several of metallurgical effects such as, e.g., formation of precipitates such as, e.g., Mo-Ni, Mo-Fe, or Mo-Ni-Fe phases, multiphase decomposition such as, e.g., into alpha plus gamma or spinodal decomposition.

Processing to achieve desirable nearly isotropic or weakly anisotropic structure may be by various combinations of sequential processing steps. A particularly effective processing sequence comprises: (1) annealing at a temperature in a range of 800–1250 degrees C. corresponding to a predominantly alpha, alpha plus gamma, or gamma phase, (2) rapid cooling, (3) limited cold deformation, e.g., by cold rolling, drawing, or swaging, and (4) aging at a temperature in a preferred range of approximately 500–800 degrees C. and for times in a typical range of approximately 5 minutes to 10 hours. Aging may have the effect of inducing multiphase structure of alpha plus precipitate such as, e.g., $(Fe,Ni)_2Mo$ or $(Fe,Ni)_3Mo_2$, alpha plus alpha prime plus precipitate, or alpha plus gamma plus precipitate.

Deformation in step (3) may be at room temperature or at any temperature in the general range of −196 degrees C. (the temperature of liquid nitrogen) to 600 degrees C. If deformation is carried out at a temperature above room temperature, the alloy may subsequently be air cooled or water quenched. Deformation results in preferred cross-sectional area reduction of less than 80 percent and preferably less than or equal to 50 percent. Ductility adequate for deformation is assured by limiting the presence of impurities and, in particular, of elements of groups 4*b* and 5*b* of the periodic table such as Ti, Zr, Hf, V, Nb, and Ta.

Figure 3:
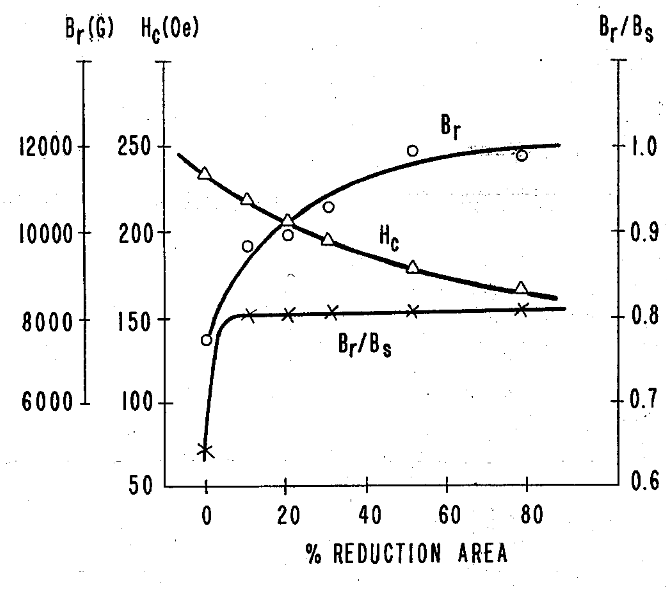
FIG. 3 shows near-isotropic magnetic properties of a Fe-20Mo-5Ni alloy according to the invention as a function of percent reduction in cross-sectional area by rolling prior to aging (a body of the alloy was solution annealed at a temperature of 1200 degrees C., water quenched, cold rolled, and aged at a temperature of 610 degrees C. for 4.5 hours)

Ultimate magnetic properties of a nearly isotropic alloy of the invention depend on amount of deformation as illustrated in FIG. 3. Cold work prior to aging strongly enhances remanence and squareness, remanence near 11,000 gauss in an exemplary alloy being almost 30 percent higher than that of widely used, high-cobalt Vicalloy (52Co-38Fe-10V) which has comparable coercivity and squareness. Accordingly, significant potential savings may be realized upon replacement of Vicalloy by the present alloy in certain applications.

It is considered noteworthy that desirable improvement in magnetic properties in alloys of the invention becomes noticeable at relatively low levels of deformation, e.g., at 10 percent reduction in cross-sectional area, and that heavy deformation such as, e.g., greater than or equal to 80 percent reduction does not result in significant further improvement. Rather, magnetic properties such as, e.g., coercivity, decrease upon increased deformation, as is illustrated in FIG. 3. Accordingly, severe deformation prior to aging is not desirable. High temperature annealing of very thin foils prior to aging may cause warping and distortion; this may be avoided by annealing a thicker foil, followed by rolling and aging. Slightly lowered coercivity may result in the process.

Alloys of the invention are highly ductile and cold formable in the annealed state. Intermediate plastic deformation for alloy shaping may be performed by severe deformation, resulting in 80 percent or greater reduction in cross-sectional area without intermediate softening anneal. Cold formability is excellent; for example, cold forming involving bending may produce a change of direction of up to 30 degrees with a bend radius not exceeding thickness. For bending through larger angles, safe bend radius may increase linearly to a value of 4 times thickness for a change of direction of 90 degrees. Flattening may produce a change of width-to-thickness ratio of at least a factor of 2. After cold forming, the alloys may be annealed and aged to achieve isotropic magnet properties, or they may be aged directly without anneal. Alloys of the invention remain highly ductile even after plastic deformation. Lightly rolled strips, for example, may be cold formed and aged to obtain near-isotropic, high remanence magnet properties.

Figure 4:
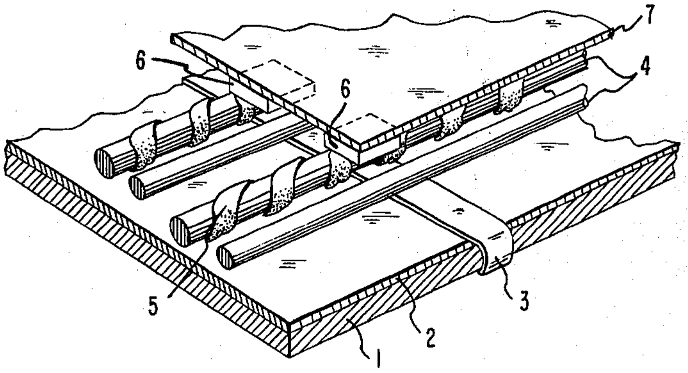
FIG. 4 shows a permanent magnet twistor memory device comprising Fe-Mo-Ni magnets according to the invention.

Alloys of the invention may be substituted for high-cobalt, expensive Vicalloy (52Co-38Fe-10V) in permanent magnet twistor (PMT) memories. A schematic view of such memory element arrangement is shown in FIG. 4 which shows substrate 1, permalloy shield 2, solenoid wire 3, sense wires 4, permalloy twistor tape 5, permanent magnet 6, and aluminum support card 7. Information is stored by means of a number of small permanent magnets 6 which are made of an alloy of the invention and which are attached to an aluminum card 7 which is inserted into the memory. An unmagnetized magnet may represent a stored one and a magnetized one a stored zero. Sensing of the magnetic state of a magnet is triggered by means of a current pulse in solenoid 3. If the magnet is not magnetized, the magnetization of a portion of permalloy tape 5 immediately over solenoid wire 3 will be reversed and an induced voltage will be sensed between wires 5. If magnet 6 is magnetized, permalloy tape 5 will be biased sufficiently far into saturation so that no irreversible flux change will occur, and negligible induced voltage results. Memories of this type may be used as program stores in electronic switching systems.

PMT memory application of alloys of the invention may proceed as follows. An alloy is hot rolled and cold rolled into a thin sheet of about 0.001 inch thickness and may be either annealed and aged (isotropic) or annealed, lightly cold rolled, and aged (near-isotropic). The sheet is bonded with an epoxy polyamide adhesive to an about 16 mil thick aluminum support card. An asphaltic etch resist is then screen printed onto the alloy to form a matrix of square and rectangular magnets. Areas not covered with the resist are then chemically etched away, using solutions containing, e.g., ammonium persulfate or sodium persulfate. In the interest of reasonable commercial processing speed, etching should be completed within minutes and preferably within 5 minutes at a temperature near 50 degrees C. The chemical etching solution for the Fe-Mo-Ni magnet is such as not to etch the aluminum support card. Each card (approximately 6 inches by 11 inches) comprises 2880 magnets measuring 35 to 40 mil square and 65 rectangular magnets measuring 20 by 128 mils. Specified magnetic properties for Fe-Mo-Ni alloys for PMT memory application are remanent induction, $B_r$, greater than 7500 gauss, coercive force, $H_c$, between 190 and 250 oersted, and remanent flux density, $B_d$, greater than 7000 gauss at a demagnetizing field of −100 oersted.

Among desirable properties of Fe-Mo-Ni permanent magnet alloys are the following: (1) abundant availability of constituent elements Fe, Mo, and Ni, (2) ease of processing and forming due to high formability and ductility, both before and after plastic deformation, (3) remanence in nearly isotropic alloys as much as 30 percent higher than that of Vicalloy, and (4) in the case of Vicalloy substitution in twistor memory application, ease of bonding to aluminum sheet and ease of etching at practicable rate using familiar etching. solutions and without affecting an aluminum support card.

Preparation of Fe-Mo-Ni permanent magnets according to the invention is illustrated by the following examples. Examples 1-4 are of isotropic magnets; Examples 5 and 6 are nearly isotropic magnets. Magnetic properties are shown in Table 1.

EXAMPLE 1

An Fe-15Mo-5Ni ingot was homogenized at a temperature of 1250 degrees C., hot rolled at a temperature of 1160 degrees C., cold rolled 85 percent area reduction to 15 mil, annealed at 1150 degrees C., aged at a temperature of 610 degrees C. for 4.5 hours, and air cooled.

EXAMPLE 2

An Fe-18Mo-5Ni alloy was processed according to the schedule of Example 1.

EXAMPLE 3

An Fe-20Mo-3Ni alloy was homogenized, hot rolled, and cold rolled 80 percent to 13 mil, annealed at 1200 degrees C. for 3 minutes, and aged at a temperature of 610 degrees C. for 4.5 hours.

EXAMPLE 4

An Fe-20Mo-5Ni alloy was processed according to the schedule of Example 3. A value $(BH)_{max}$=0.9MGOe was determined for maximum energy product.

EXAMPLE 5

An Fe-20Mo-5Ni alloy was processed as in Example 3, except that a step of cold rolling of 30 percent area reduction was carried out prior to aging. A value $(BH)_{max}$=1.1MGOe was determined for maximum magnetic energy product.

EXAMPLE 6

An Fe-20Mo-5Ni alloy was processed as in Example 5, except that cold rolling prior to aging was by 80 percent area reduction.

TABLE 1

| Example | $B_r$ gauss | $B_r/B_s$ | $H_c$ oersted |
|---|---|---|---|
| 1 | 9500 | 0.72 | 94 |
| 2 | 9150 | 0.74 | 186 |
| 3 | 7900 | 0.69 | 140 |
| 4 | 7500 | 0.64 | 220 |
| 5 | 10700 | 0.82 | 205 |
| 6 | 11200 | 0.82 | 170 |

We claim:

1. Magnetically isotropic or nearly isotropic permanent magnet alloy having a remanent magnetic induction which is greater than or equal to 7000 gauss, a coercive force which is greater than or equal to 50 oersted, and a magnetic squareness ratio which is less than 0.9 CHARACTERIZED IN THAT an amount of at least 95 weight percent of said alloy consists of Fe, Mo, and Ni, Mo being in the range of 10-40 weight percent of said amount, and Ni being in the range of 0.5-15 weight percent of said amount.

2. Permanent magnet alloy of claim 1 in which an amount of at least 99.5 weight percent consists of Fe, Mo, and Ni.

3. Permanent magnet alloy of claim 1 in which Mo is in the range of 12-30 weight percent of said amount, and in which Ni is in the range of 1-10 weight percent of said amount.

4. Permanent magnet alloy of claim 1 having magnetic coercivity in the range of 50-500 oersted, having magnetic remanence in the range of 7000-14,000 gauss, and having magnetic squareness less than or equal to 0.85.

* * * * *